Sept. 8, 1942. C. STEGMEIER 2,295,492
EMERGENCY REAR AXLE LOCKING DEVICE
Filed Oct. 8, 1941
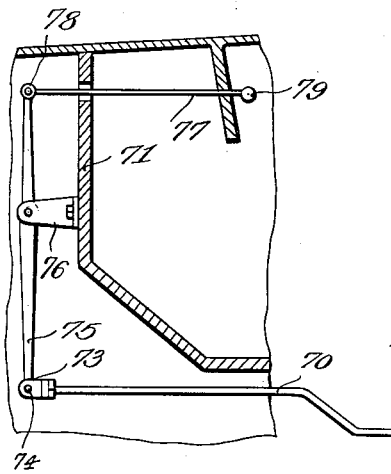
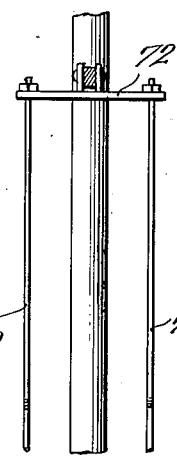
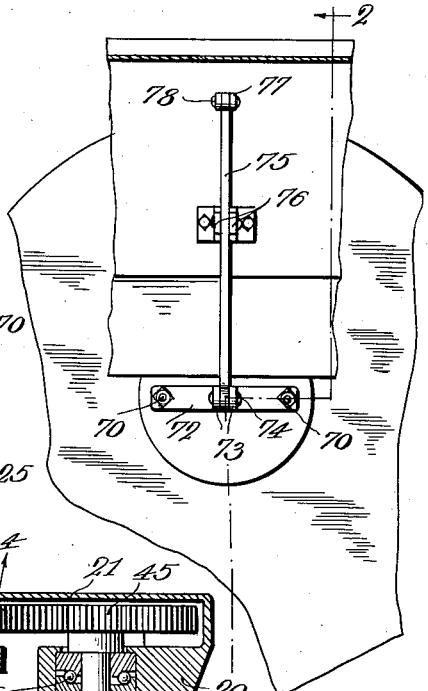
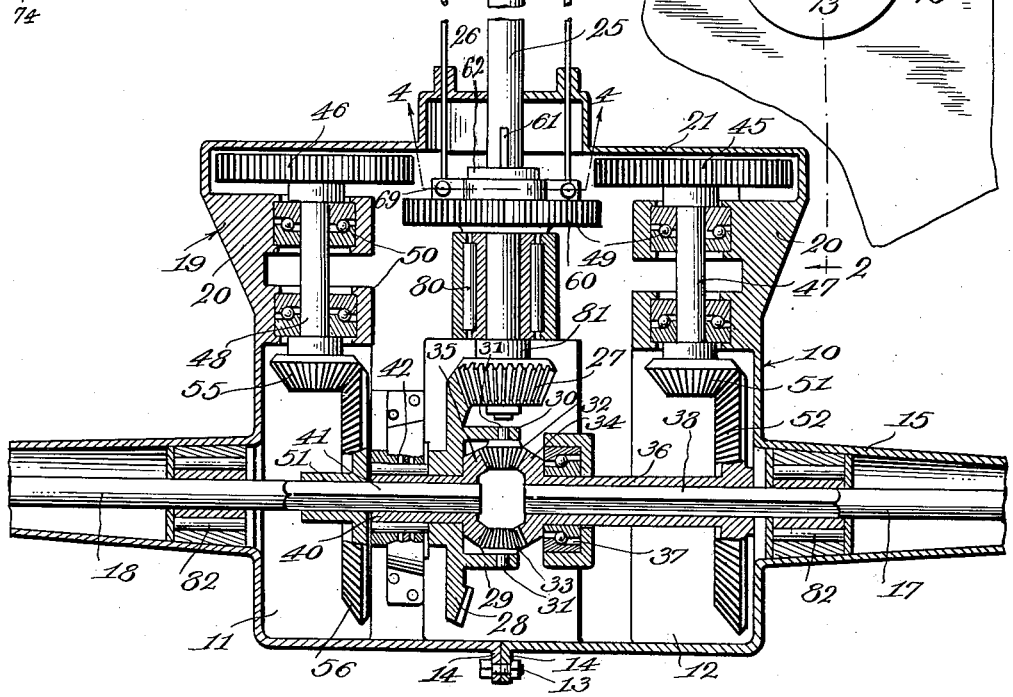
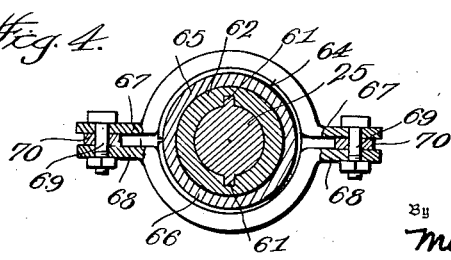
Inventor
Charles Stegmeier
By Munn, Liddy, Glassum & Kane
Attorneys Patented Sept. 8, 1942

2,295,492

UNITED STATES PATENT OFFICE 2,295,492

EMERGENCY REAR AXLE LOCKING DEVICE

Charles Stegmeier, Auburn, Calif.

Application October 8, 1941, Serial No. 414,193

2 Claims. (Cl. 74—316)

This invention relates to an emergency rear axle locking device.

An object of the invention is the provision of an attachment to a differential of a vehicle for causing the axles of the rear wheels to be driven simultaneously and at the same speed when desired.

Another object of the invention is the provision of a device associated with the differential of an automative vehicle in which both of the axles may be locked together whereby the axles will be rotated at the same speed regardless of the load applied to the axles, said device including means for manually changing the differential action into a positive action for both axles.

A further object of the invention is the provision of an improved differential in which both rear axles may be driven simultaneously and at the same speed particularly where one of the wheels has positive traction and the other wheel is on the ground which will permit the wheel to revolve without traction, the positive action being had during either forward or reverse speed.

This invention will be best understood from a consideration of the following detailed description in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a horizontal section of a differential and a device for creating positive speeds of both rear axles.

Figure 2 is a fragmentary vertical section taken along the line 2—2 of Fig. 3.

Figure 3 is a front view in elevation of the dash and the operating means for controlling the positive rotation of both rear axles.

Figure 4 is a transverse vertical section taken along the line 4—4 of Fig. 1.

Referring more particularly to the drawing, 10 generally designates a modified form of differential housing which is formed of two sections 11 and 12 secured together by means of bolts 13 passing through flanges 14 on the inner abutting ends of the sections 11 and 12. The housing 10 is extended on its opposite sides to provide housings 15 and 16 for the respective axles 17 and 18. The forward end of the housing is shown at 19 as flared and its walls are thickened as shown at 20 for a purpose which will be presently explained. A plate 21 closes the inner end of the housing 10.

A driving shaft 25 extends from the usual transmission casing (not shown) to and through a boss 26 formed on the plate 21.

A gear 27 is secured to the inner end of the shaft 25 and meshes with a master gear 28 which has inwardly extended bearings 29, 30, to receive shafts 31 for carrying planetary gears 32 and 33 meshing with a gear 34 at one side of the shaft 25 while a gear 35 also meshes with the gears 32 and 33 at the other side of the shaft.

A hollow shaft 36 is connected to the gear 34 and this shaft is mounted in a bearing 37 carried by the housing 10. It will be noted that the inner end of the axle 17 is substantially rectangular in cross section which conforms to a complementarily formed inner wall of the sleeve 36 so that the gear 34 will drive the axle 17 through the squared portion 38 of the axle 17.

A sleeve 40 is secured to the gear 35 and is received by the inner end of the axle 18. The inner end of the axle as shown at 41, is rectangular in cross-section as is the inner circumference of the sleeve 40, so that the gear 35 will drive the axle 18 through the sleeve 40 and the squared portion 41 of said axle. The sleeve 40 is mounted in bearings 42 secured to the section 11 of the housing 10.

It will be noted from this construction that when the shaft 25 is revolved in either direction the gear 27 will drive the gear 28 and through the intermediary of the gears 32 and 33, the gears 34 and 35 will likewise be revolved for rotating the shafts 17 and 18. When, however, one of the wheels will lose traction because it has been mired in sand or other soft material, said wheel will remain stationary due to the action of the differential while the other wheel will be revolved through its axle and the differential. Where traction cannot be obtained for the said wheel it will be impossible for the driver of the vehicle to force the car ahead.

A pair of idling gears 45 and 46 are secured to the respective shafts 47 and 48 which are mounted in respective bearings 49 and 50. These bearings, it will be seen, are carried by the thickened portions 20 of the walls of the housing 10.

A gear 51 is secured to the inner end of the shaft 47 and meshes with a gear 52 which is connected to the sleeve 36 on the axle 17. Thus it will be seen that when the gear 34 is revolved the gear 52 and likewise the gears 51 and 45 will also be revolved in an idle manner.

The gear 55 is secured to the shaft 48 and meshes with a gear 56 which is secured to a sleeve 57 received by the squared end 41 of the axle 18. The interior wall of tne sleeve 57 is formed complementarily to the squared end 41 of the axle so that when the axle is driven by the differential the gear 56 will likewise be driven, as will be the gears 55 and 46. At this time, however, said gears will revolve idly.

A gear 60 is slidably mounted on the drive shaft 25 and has the same diameter and the same number of teeth as the gears 45 and 46. A pair of keys 61 are formed integrally with the shaft 25 and are received within slots in a collar 62 and likewise the central opening in the gear 60 so that the said gear will be driven by the said shaft 25 but due to the keys, said gear may be shifted in opposite directions. The collar is provided with a flange 63 which retains a split collar 64 on the sleeve.

The last mentioned collar is formed of two sections 65 and 66 which have respective ears 67 and 68 extending laterally therefrom. The pairs of ears 67 and 68 are perforated to receive a bolt 69 and these bolts pass through perforations in the inner ends of operating rods 70 which extend forwardly and terminate adjacent the dash 71 of the automobile where they are connected to a cross bar 72.

The cross bar is provided with a pair of ears 73 which receives a bolt 74 passing through a perforation in a lever 75 hingedly mounted on a pair of brackets 76 secured to the outer face of the dash 71. An operating rod 77 is pivotally connected at 78 with the upper end of the lever 75 and this rod extends rearwardly and is provided with a hand grip 79 which is located in a convenient position adjacent the driver of the vehicle.

A thrust bearing 80 is in egagement with a hub 81 of the gear 27 and is also in engagement with the gear 60 when said gear is located in an inoperative position.

Roller bearings 82 are located within the housing 15 and 16 and embrace the axles 17 and 18. The housing 10 may be packed with grease or filled with oil so that all of the parts of the differential and the improvements thereto operate in a lubricant.

The operation of my device is as follows: When the car is operated normally the gear 60 is maintained in an inoperative position as shown in Fig. 1 and out of mesh with the gears 45 and 46. During the normal operation of the vehicle the axles 17 and 18 are driven by the usual differential described above until one wheel of the vehicle loses traction by being mired in sand or other soft material. When this happens the operator of the car will pull on the rod 77, thereby causing the rod 70 to move the gear 60 forwardly and into mesh with the gears 45 and 46. When this happens the axles 17 and 18 are positively driven through the intermediary of the respective gears 51, 52 and 55, 56.

It will be noted that the gears 45 and 46 have the same diameter and therefore the same number of teeth so that the gear 60 will drive the shafts 48 and 47 at substantially the same speed. It will be further noted that the gears 51 and 55 and the gears 27 will deliver substantiallly the same speed to the gears 28, 52 and 56. Since the last mentioned gears are substantially the same, the axles 17 and 18 will be driven at the same speed through the gears 52 and 56 as they would be driven at the same speed of the shaft 25 by the differential.

I claim:

1. In a differential gearing for rotating a pair of axles for vehicles and actuated by a drive shaft in which one axle may be revolved while the other axle remains stationary, means positively rotating both axles simultaneously regardless of the differential load applied to the axles, said means comprising a gear connected to one axle, a second gear mounted on the other axle, a sleeve formed integrally with the second gear with a gear of the differential gearing also mounted on the same axle, means connecting the sleeve to the second mentioned axle, an idling gear adjacent each of the first mentioned gears, operative connections between the adjacently disposed gears, an auxiliary gear rotated by the drive shaft and adapted to be shifted into and out of mesh with the idle gears, and manual means for shifting the auxiliary gear.

2. In a differential gearing for rotating a pair of alined axles of a vehicle and actuated by a drive shaft in which one axle may be revolved while the other axle remains stationary, means positively rotating both axles at the same speed regardless of the load applied to the axles and comprising a housing enclosing the differential, one end of the drive shaft and the inner alined ends of the axles, an idling gear mounted in the housing at each side of the drive shaft, an auxiliary gear rotated by and slidable on the drive shaft, means moving the auxiliary gear into mesh with the idling gears, a gear connected with each axle at an intermediate portion thereof, operative connections between each of the last-mentioned gears and an adjacently disposed idling gear, and a sleeve forming the connection between one of the last-mentioned gears and its associated axle, said sleeve being connected to one of the gears of the differential gearing.

CHARLES STEGMEIER.